UNITED STATES PATENT OFFICE.

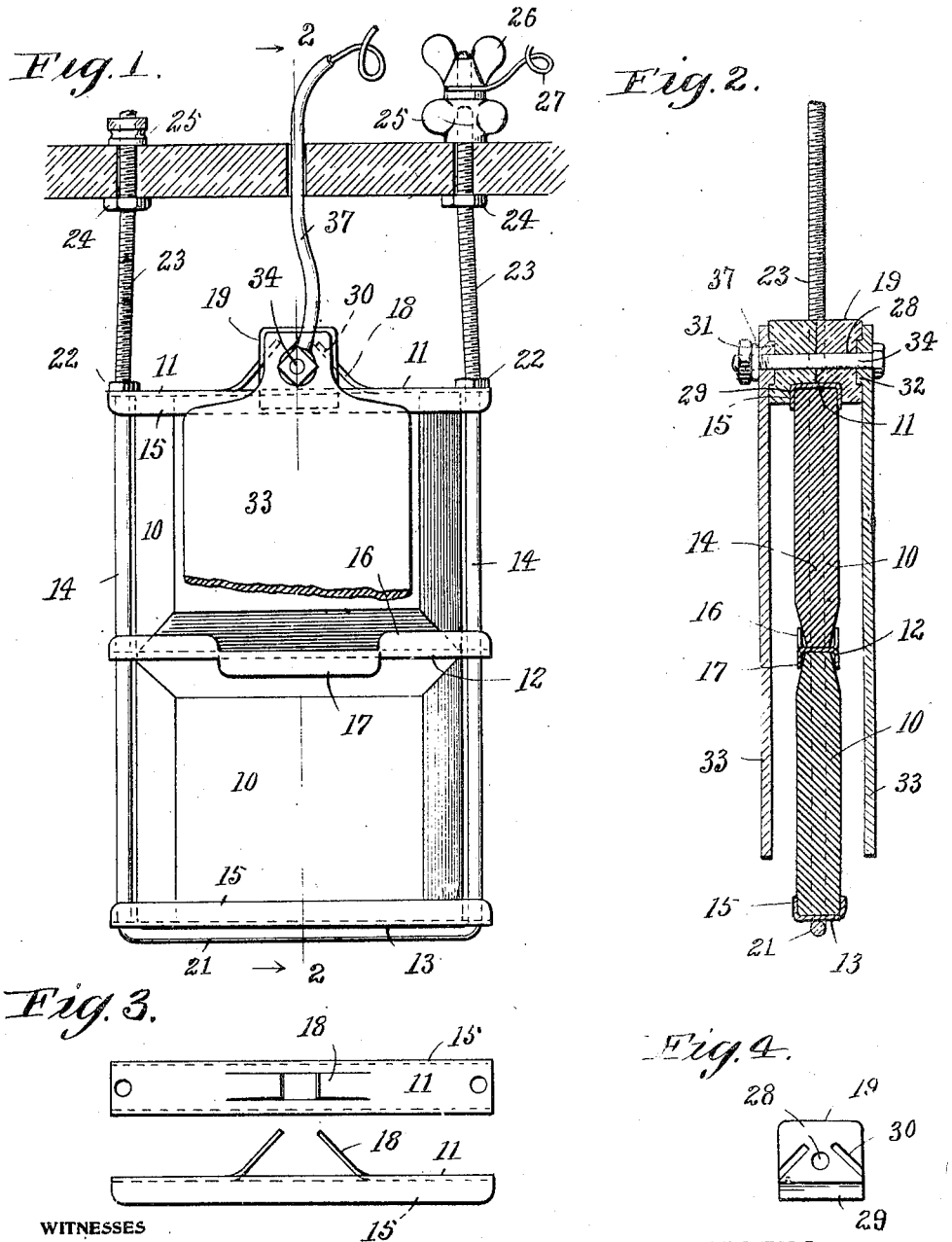

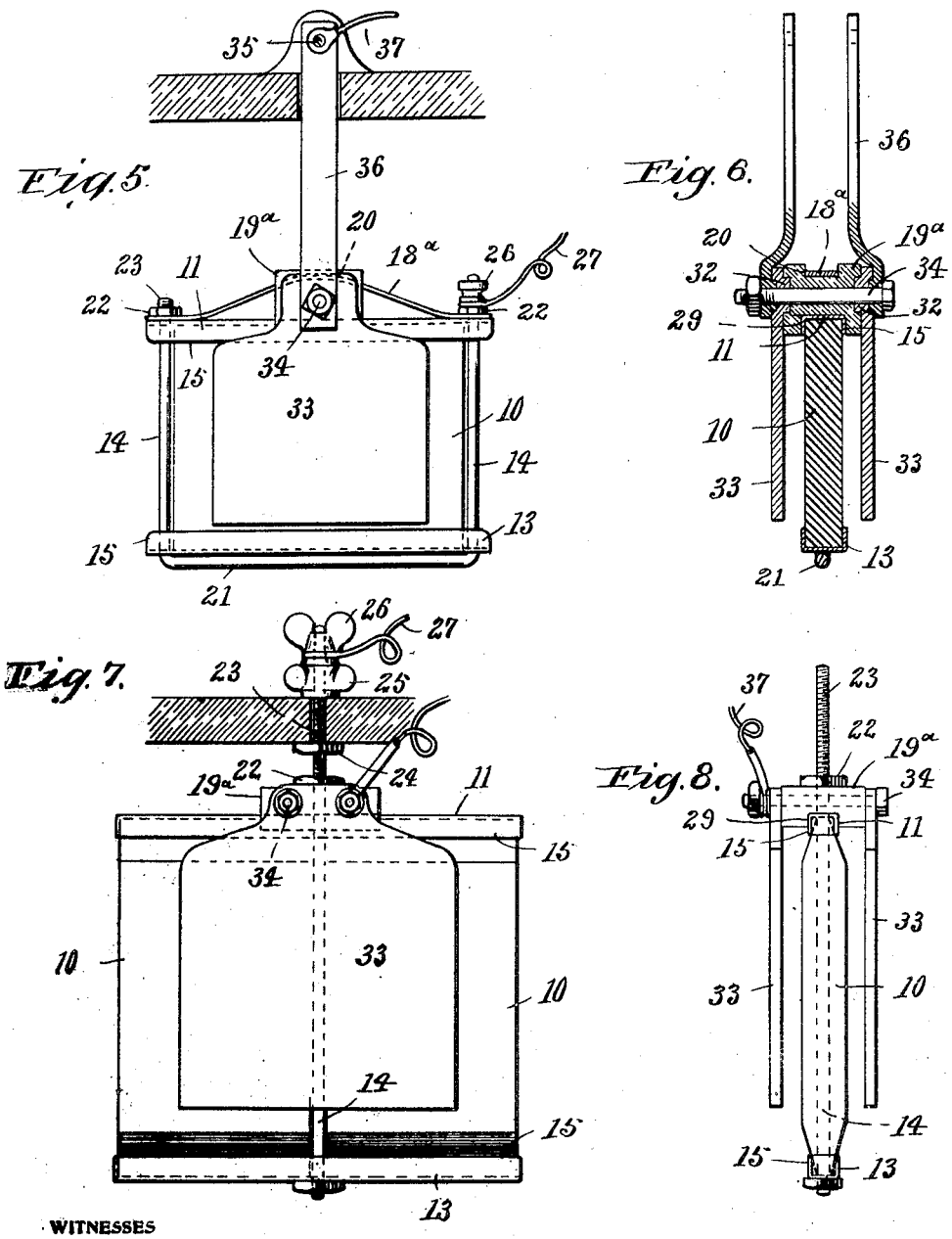

CHARLES B. SCHOENMEHL AND WILLIAM G. C. KRAUSE, OF WATERBURY, CONNECTICUT; SAID KRAUSE ASSIGNOR TO SAID SCHOENMEHL.

BATTERY-ELECTRODE SUPPORT.

No. 922,728.	Specification of Letters Patent.	Patented May 25, 1909.

Application filed June 10, 1908. Serial No. 437,616.

*To all whom it may concern:*

Be it known that we, CHARLES B. SCHOENMEHL and WILLIAM G. C. KRAUSE, citizens of the United States, and residents of Waterbury, in the county of New Haven and State of Connecticut, have invented certain new and useful Improvements in Battery-Electrode Supports, of which the following is a specification.

Our invention relates to new and useful improvements in primary battery electrode supports such as are formed of compressed metal oxid and zinc and as are now commonly employed in batteries of the above class.

It is the purpose of the invention to provide a support, that will serve to carry both the positive and negative electrodes, and is of such a construction as to receive compressed and baked metal oxid plates just as they come from a furnace without any trimming or fitting of the edges, thus materially saving on the cost of assembling; to provide a support that holds such a plate or plates by engaging but a portion of its edges, leaving the faces of the plate unobstructed and free for chemical action, further to so construct the frame as to allow the plates to be readily attached or removed as occasion may require, and finally to include means for insulatingly connecting and suspending the positive electrodes as for instance zinc plates, on either side of the negative electrode.

With the above objects in view our invention resides and consists in the novel construction and combination of parts shown upon the accompanying two sheets of drawings forming a part of this specification, upon which similar characters of reference denote like or corresponding parts throughout the several figures and of which, Figure 1, represents a side elevation of a battery electrode support constructed in accordance with our invention and having both the positive and negative electrodes attached thereto. Fig. 2, is a central vertical longitudinal section taken on line 2—2 of Fig. 1. Fig. 3, shows a detached top plan, and a side elevation respectively, of the top member of the frame. Fig. 4, is a detail side view of one of a pair of insulating blocks used intermediate of frame and zinc plates. Figs. 5 and 6 show a side elevation, and central vertical longitudinal section respectively, of a slightly different form of supporting frame, constructed in accordance with our invention and designated to carry but one negative electrode instead of two, as shown in Figs. 1 and 2, and Figs. 7 and 8, show a side elevation and side edge view respectively, of a further slight modification of the invention.

As will be seen from the drawings the features of the invention consist in part, in providing metal cross strips for engaging opposite edges of an electrode and a wire frame with suitable means for supporting the device from covers of different forms, and clamping means for drawing the said strips against the edges of the electrode in a manner to hold the same.

Referring in detail to the reference characters marked upon the drawings 10 represents the negative electrodes which may be formed of suitably ground oxid of copper, by being first pressed into form and then baked to required degree of hardness. In the form shown in Figs. 1 and 7, we have shown two of such forms of metal oxid electrodes mounted in the support, while the form shown in Figs. 5 and 6 is designed to accommodate but one. The support may therefore be made larger or smaller as the case may require, to accommodate any number of electrodes. The plates are thus taken just as they come from the furnace and inserted intermediate the strips 11, 12 and 13, which engage the horizontal edges of the plates, and are clamped edgewise by the vertical metal wire rods 14. The strips are provided with side flanges 15 turned over at substantially a right angle to engage the side edges of the plates in substantially the manner indicated. The top and bottom strips have such flanges disposed in but one direction, while the flanges of the intermediate strip are divided and the parts 16 turned up on the side edges of the top plate while the other parts 17 are similarly disposed against the bottom plate. The top strip 11 may be further provided with braces 18 struck up from the central top portion to engage the insulating blocks 19 for supporting the same or we may use a separate piece 18ª as shown in Figs. 5 and 6 for a similar purpose. The piece 18ª shown in these figures is made of suitably bent sheet metal to engage a recess 20 in top of block and to lay flat upon the outer top end portions of the strip 11 and is further provided with holes in its outer ends to receive the ends of the vertical rods 14. These side rods are preferably formed of one piece, having a horizontally disposed bottom connecting portion 21 which is disposed against the underside of the bottom strip 13, thus forming what might be termed a U shaped clamping member. The cross strips are each provided with holes in their outer end portions through which the rods are threaded, and the said strips are drawn together against the edges of the plates by means of nuts 22 that engage the threaded end portions 23 of the wire rods. In Figs. 1 and 2, these two rods are shown extended upward to engage the cover and suitable nuts 24 and 25 are threadably attached to clamp against the top and bottom sides of the cover as shown, a further thumb nut 26 is also provided for the attachment of the filed wire 27 and obviously serves for the connection to negative side of the battery.

The two blocks 19 as shown in Figs. 1, 2 and 4 are alike in construction and each contain a bolt hole 28, notches 29, pockets 30 and shouldered recesses 31 which latter accommodate the several attached parts. When the two blocks are assembled as shown they serve as one and the two notches 29 jointly receive the top strip of the frame upon which the said block is seated while the pockets 30 of one block register with those of the other to form a suitable socket to receive the ends of the braces, and which rigidly hold the blocks in position. The recesses in sides of blocks accommodate the shouldered lugs 32 on the zinc plates 33—33 which are secured to the said blocks by means of the bolt 34 and its nut, and are properly spaced from the copper plates.

In Figs. 5 and 6, we have shown a smaller supporting frame for smaller electrodes and a central attaching device which comprises a pair of hangers 36 that are secured to the bolt 34 and extend upward from either side of the support and are designed to pass through separate holes in the cover and be attached by a horizontal bolt 35.

In Figs. 7 and 8, we have illustrated a support wherein the negative metal plates are arranged side by side supported by the strips 11—13 and a single suspending rod 14 located intermediate such plates in a way to secure the same in position and form a single suspending means, that is made attachable or detachable to and from the cover by the operation of a single nut 25. In this form like the preceding ones, the one field wire 37 is connected with the bolt attaching the zinc to blocks, while the other connection 27 is made with a frame wire 14. A single form of insulating block 19ª is preferably used in both of the modified forms of construction.

Having thus described our invention what we claim and desire to secure by Letters Patent is:—

1. In an electrode for batteries, the combination with the other parts of a frame, of a top cross piece to engage an electrode and having extended braces to engage a block, and an insulating block seated upon said cross piece and having pockets in its side portions to receive the said braces.

2. In an electrode for batteries, the combination with the other parts of a frame, of a top cross piece to engage an electrode having brace portions connected therewith, a pair of insulating blocks seated against said cross pieces and having recesses in their face portions to receive the said brace portions.

3. In an electrode for batteries, the combination with the other parts of a frame, of a top cross piece to engage an electrode, having brace portions thereon, disposed upward from the intermediate top portion thereof, an insulating block seated upon the said cross pieces and inclosing the ends of said brace portions.

4. An electrode support for batteries, comprising a U shaped wire frame having its end portions threaded, sheet metal cross strips mounted on said frame to engage a negative electrode, nuts mounted upon the threaded portions of the frame to clamp the strips against the electrode and for the attachment of the frame to a battery.

5. An electrode support for batteries, comprising a U shaped wire frame having its end portions threaded, negative plate electrodes arranged within the frame, sheet metal cross strips intermediate of and against the top and bottom edges of the said plate electrodes to hold the same in position and means for clamping the said electrodes and strips together.

6. In an electrode support for batteries, the combination with a frame comprising in part a sheet metal top cross piece, braces disposed upward therefrom, an insulating block seated intermediate the said cross pieces and the braces and means for suspending an electrode from the said insulating block.

7. In an electrode support for batteries, the combination with a frame comprising in part a sheet metal top cross piece having braces struck up therefrom, an insulating block mounted intermediate the said braces and the strip, and means for supporting electrodes from said insulating block.

8. In an electrode support for batteries, the combination of a U shaped wire frame, sheet metal cross pieces having holes in their end portions to receive the side portions of the frame, negative plate electrodes arranged intermediate of the said wire frame and sheet metal strips, and means for clamping the strips against the edge portions of the electrodes.

9. In an electrode for batteries, the combination with the other parts of a frame, of a top cross piece to engage an electrode, an insulating block seated upon said cross piece and having a transverse recess in its top portion, a holding piece seated in said recess against the block to secure it to the cross piece.

10. In a battery, the combination with a copper oxid plate, of a suitable frame for supporting the same comprising in part a metal top cross piece having braces disposed upward therefrom, and means intermediate the said braces for attaching an electrode to the said cross piece and at either side of the said copper oxid plate.

11. In an electrode support for batteries, the combination with the other parts of a frame, of a top cross piece to engage an electrode, an insulating block seated upon said cross piece, and a holding strip seated against the top portion of the block to secure it to the cross piece.

Signed at Waterbury, in the county of New Haven, and State of Connecticut, this 2nd day of June A. D., 1908.

CHARLES B. SCHOENMEHL.
WILLIAM G. C. KRAUSE.

Witnesses:
THEODORE E. ROGERS,
CARRIE C. ROGERS.